Nov. 6, 1923. 1,473,592
W. P. CARTWRIGHT ET AL
FIXTURE FOR DIE CUTTING MACHINES AND THE LIKE
Filed June 21, 1919
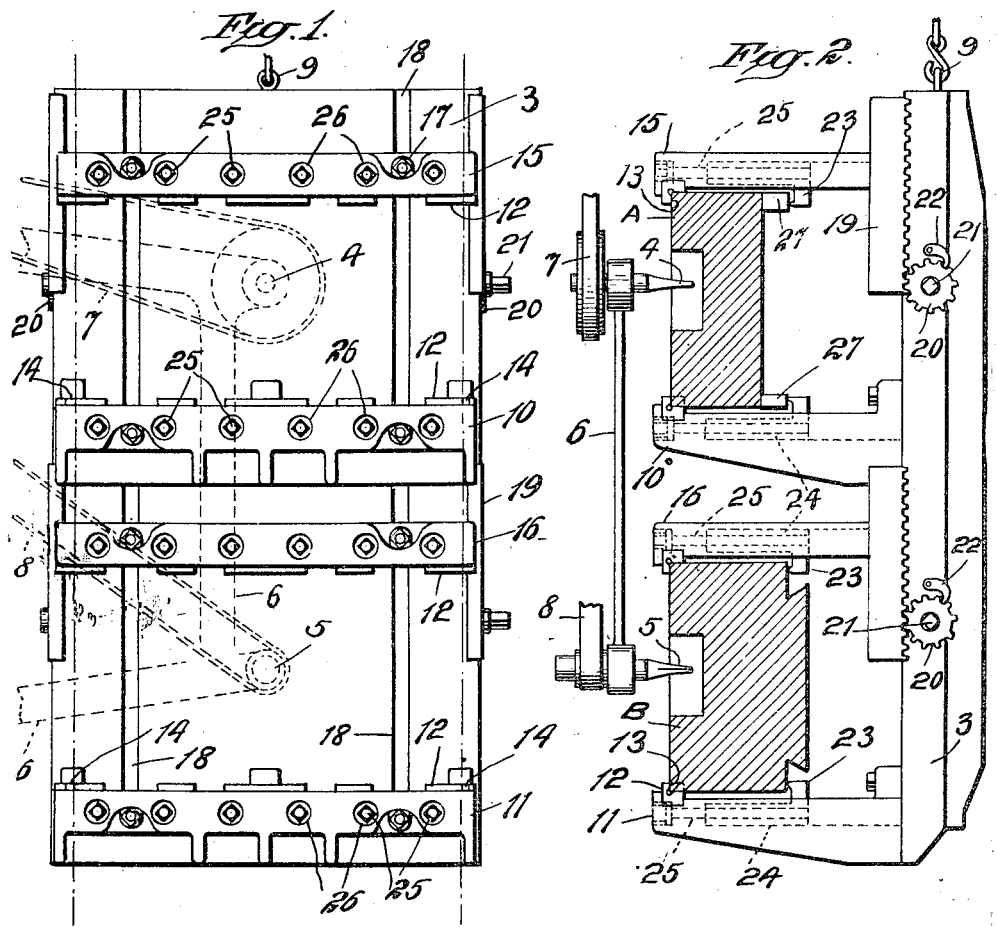
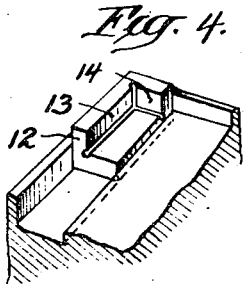
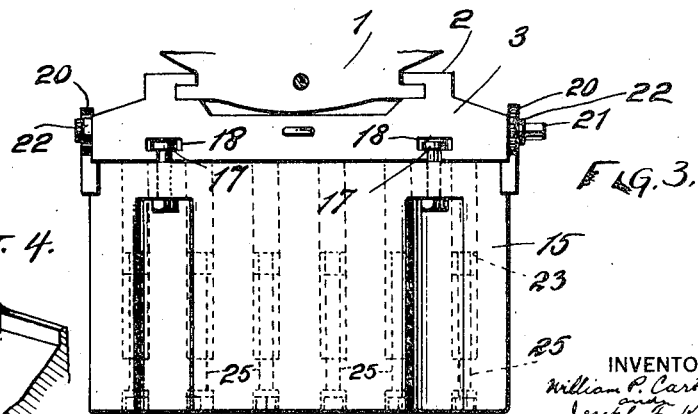
INVENTORS
William P. Cartwright
Joseph F. Keller
BY
N. H. Lockwood
ATTORNEY Patent Nov. 6, 1923.

1,473,592

UNITED STATES PATENT OFFICE.

WILLIAM P. CARTWRIGHT, OF DETROIT, MICHIGAN, AND JOSEPH F. KELLER, OF NEW YORK, N. Y., ASSIGNORS TO KELLER MECHANICAL ENGRAVING COMPANY, OF BROOKLYN, NEW YORK, A CORPORATION OF NEW YORK.

FIXTURE FOR DIE-CUTTING MACHINES AND THE LIKE.

Application filed June 21, 1919. Serial No. 305,854.

*To all whom it may concern:*

Be it known that we, WILLIAM P. CARTWRIGHT, a citizen of the United States, and resident of Detroit, county of Wayne, and State of Michigan, and JOSEPH F. KELLER, a citizen of the United States, and resident of New York, county and State of New York, jointly have invented certain new and useful Improvements in Fixtures for Die-Cutting Machines and the like, of which the following is a specification.

My invention relates more particularly to die cutting machines, in which the model or pattern is of the same size as the die to be cut. In machines of this character, a tracer is provided for following the model and a correspondingly shaped cutter is adapted to cut the die in exact reproduction of the model. Corresponding points of the tracer and cutter are located in the same planes at right angles to the axes of the tracer and cutter.

A reciprocating bed or face-plate is preferably mounted in the usual manner for movement transversely of the tracer and cutter parallel to a line joining the same, the surface of the face-plate being adapted to reciprocate or move in a plane at right angles to the axes of the tracer and cutter.

In machines of this character, it is more or less difficult at times to properly locate and hold the faces of the model and die in the same plane parallel to the surface of the face-plate, and parallel to the planes passing through corresponding points of the tracer and cutter.

Furthermore, it is desirable to accurately locate corresponding portions of the model and die in planes parallel to a plane passing through the axes of the tracer and cutter. Our improved face-plate for holding the model and die respectively has for its object the accurate and proper location respectively of the model and die in the positions above referred to, so that the die when finished will be an accurate reproduction of the model. Our improvement also provides means for securely clamping the model and die in the desired positions, said clamping means being readily accessible from the front of the work, so that the pattern and die may be quickly inserted and removed.

As illustrating our improved construction, we have shown one form of our device in the accompanying drawings, of which Fig. 1, is a front elevation of the fixture, the tracer and cutter portions of the machine being shown in dotted lines; Fig. 2, represents a side view of the reciprocating face-plate with the fixture thereon, the model and die being shown in section; Fig. 3, represents a top plan view of the reciprocating face-plate and holding fixture, and Fig. 4 shows a broken away corner of the bracket with a stop block shown in perspective.

Referring to the drawings 1, represents the pillar or support for the reciprocating bed or face-plate. Suitable slide ways 2 are provided for permitting reciprocation of the face-plate 3, transversely of the tracer and cutter spindles 4 and 5 respectively. It will be seen that the tracer and cutter spindles of this type of machine are located one above the other, with their axes in a vertical plane parallel to the direction of reciprocation of the face-plate. The usual bracket 6 is adapted to support the spindles 4 and 5, which are driven respectively by the belts 7 and 8 in the usual or any preferred manner. A link and eye-bolt connection is made with the face-plate at 9 with a counter weight for balancing the weight of the face-plate, which in the form of machine here shown reciprocates vertically.

Our improvement consists primarily of a pair of brackets secured to the face-plate, adapted for holding the model and a corresponding pair of brackets similarly secured to the face-plate for holding the die. Referring to the drawings it will be seen that the brackets 10 and 11, one of each of the pairs referred to, are substantially identical, and are adapted to be secured fixedly to the face-plate so that corresponding working portions thereof are at a distance apart exactly equal to the distance between the axes of the tracer and cutter. At the forward edge of these brackets, we preferably insert hardened steel angle members 12 preferably having their faces 13 ground true in the same plane and parallel to the surface of the face-plate 3, and hence parallel to the plane of reciprocation of the face-plate. These faces 13 of the angle members or lugs, are adapted to accurately locate the respective faces of the model and die in the same vertical plane, parallel to a plane through corresponding points in the tracer and cutter.

In preparing the steel blocks from which the dies are made, adjoining edges at one corner thereof are planed off exactly at right angles to each other, and to the face of the block for a short distance back from the face in order to assist the workman in accurately inserting and positioning the finished dies for use in the drop hammer. These planed surfaces are preferably utilized in locating the die block on our improved bracket member 11, and we preferably provide lugs or members 14 extending at right angles to the faces 13 of the lugs 12, for locating the die transversely of the face-plate 3. These lugs 14 may be suitably located on the brackets 10 and 11, preferably at the ends thereof as indicated in Figs. 1 and 4 of the drawings. The lugs or members 14 are adapted to cooperate with the planed edges of the die block, previously referred to and with a corresponding edge or corner of the model to accurately position the model and die, so that corresponding portions thereof will lie in the same vertical planes parallel to a line between corresponding points on the tracer and cutter, and at right angles to the surface of the face-plate.

Cooperating, respectively, with the fixed brackets 10 and 11, we provide similar brackets 15 and 16 adjustably mounted upon the face-plate, but adapted to be secured thereto by means of bolts 17 operating in the usual T-grooves or slots 18 in the face-plate 3. The brackets 15 and 16 are similarly provided with angle lugs or members 12 having corresponding faces 13 in the same vertical plane parallel with the surface of the face-plate and are adapted to hold the upper edges of the model and die respectively. Each of the brackets 15 and 16 is preferably provided with a pair of racks 19 secured thereto, one at each side thereof in parallel relation with the vertical edges of the face-plate 3. Each of the racks 19 is adapted to mesh with a pinion 20, two oppositely located pinions 20 being connected together by a rod or shaft 21, whereby they are adapted to be turned in unison. The projecting ends of the rods 21 are preferably squared so that a wrench or handle may be applied for turning the pinions 20 and raising or lowering the corresponding brackets 15 and 16. In this way it will be understood, that the brackets 15 and 16 may be moved toward or from the fixed brackets 10 and 11, and adjusted to the model and die respectively. Suitable pawls 22 are prefably provided for holding the brackets 15 and 16 in temporarily adjusted positions when they are not secured to the face-plate by means of the clamping bolts 17.

We preferably provide means for clamping the model and die respectively against the positioning members 12, on the brackets 10, 11, 15 and 16 so that they may reciprocate with the face-plate in planes parallel to a line between corresponding points of the tracer and cutter. The clamps are indicated in Fig. 2 of the drawings at 23. The clamps 23 are preferably mounted in slots extending toward and from the surface of the face-plate, and each is preferably provided with a tubular internally threaded portion 24, adapted to cooperate with a screw 25, the head of which projects into a socket 26 on the outer front edge of each of the brackets 10, 11, 15 and 16 substantially as indicated in Figs. 1 and 2 of the drawings. The heads of the bolts or screws 25 are squared so that a socket wrench may be used thereon for moving the corresponding clamping members 23 into or out of clamping position with respect to the model or die. Obviously if the model or die is too thin to be clamped directly by the members 23, intervening blocks 27 may be employed in the usual or any preferred manner.

In the operation of our improved fixture, it will be observed that the positioning lugs 14 have their working faces in the same vertical plane on the respective brackets 10 and 11, as indicated by the dotted lines, which lines are parallel to a vertical line between corresponding points of the tracer and cutter. The brackets 15 and 16 are first moved upward away from the respective fixed brackets 10 and 11, and the pattern A is inserted and its face edge brought against the face 13 of the members 12, the bracket 15 then being lowered to bring the corresponding members 12 thereof into cooperative relation with the model.

The model is then moved so that the corner or side edge is brought into contact with the member 14, thereby locating the model with respect to the tracer with its face parallel to the surface of the face-plate. The model is then clamped in position by the clamps 23 of the two brackets 15 and 10 substantially as indicated in Fig. 2. Similarly the die B is inserted between the brackets 11 and 16 and the face thereof brought against the faces 13 of the members 12 thereof, and the planed edge previously referred to is brought into contact with the corresponding member 14, so as to accurately locate corresponding portions of the die and model in the same vertical planes parallel to a vertical line between the axes of the tracer and cutter, and equally distant from the surface of the face-plate. When thus positioned the die is secured by means of the corresponding clamps 23, of the brackets 11 and 16, the brackets 15 and 16 having been securely clamped to the face-plate 3 in position by means of the bolts 17.

When removing the model or die, the respective brackets 15 and 16 may be shifted after being released from the face-plate by turning the pinions 20 and may be held in temporarily adjusted positions by means of the pawls 22 engaging the teeth of the pinions.

We have shown our improved positioning and clamping fixture in connection with a duplicating die cutting machine having a reciprocating face-plate or bed, but obviously it will be understood that modifications of our improvement may be adapted for other forms of die cutting machine, and for different types of face-plates, therefore we do not wish to be limited to the specific construction shown and described. Furthermore, in defining the position of the tracer and cutter it will be understood that normally the planes of corresponding portions of the tracer and cutter are at right angles to the axes of the tracer and cutter. But since in operation the tracer and cutter are adapted for motion toward and from the face-plate, it may be correctly stated that corresponding points on the tracer and cutter lie in the same plane parallel to the surface of the face-plate, and in a plane parallel to the plane of the axes of the tracer and cutter.

Various modifications in the specific details of construction may be made without departing from the spirit and scope of the invention.

We claim:

1. In a die cutting machine or the like, a fixture comprising a movable face-plate, brackets secured to the face-plate, said brackets being provided with members having work holding faces facing toward and located in a plane parallel with and spaced from the surface of said face-plate, and means for clamping the work against said faces.

2. In a die cutting machine or the like, a fixture comprising a face-plate movable in its own plane, brackets secured to said face-plate, work holding members supported by said brackets at a fixed distance from the surface of said face-plate, said members being provided with work supporting faces facing toward and located in a plane parallel with the surface of said face-plate, and adjustable clamping means for holding the work against said work supporting faces.

3. In a die cutting machine or the like, provided with tracer and cutter spindles, a fixture comprising a face-plate mounted for movement in a plane at right angles to the axes of said tracer and cutter spindles, brackets secured to said face-plate for supporting the pattern and die respectively, means on said brackets cooperating with the respective faces of the pattern and die for locating the same in a plane parallel to the surface of said face-plate, means for locating corresponding portions of the pattern and die in planes parallel to a plane through the axes of the tracer and cutter spindles, and means for clamping the pattern and die respectively when so located.

4. In a die cutting machine or the like, provided with tracer and cutter spindles, a fixture comprising a face-plate mounted for reciprocation in a plane at right angles to the axes of said tracer and cutter spindles, brackets permanently attached to said face-plate and spaced apart the distance between the tracer and cutter spindles for supporting respectively the model and die, adjustable brackets mounted on the face-plate for movement toward and from and in parallel relation to said permanently attached brackets, for accommodating models and dies of different sizes, means for clamping the adjustable brackets to the face-plate when properly adjusted to the model and die respectively, means on said brackets for locating the respective faces of the model and die in the same plane parallel to the plane of reciprocation of said face-plate, means on said brackets for positioning the model and die respectively so that corresponding portions thereof shall lie in the same plane parallel to a plane through the axes of the tracer and cutter, and means for clamping the model and die respectively, when so located and positioned.

5. In a die cutting machine or the like, provided with tracer and cutter spindles spaced apart a fixed distance, the axes thereof being in the same plane, and the corresponding working portions of said tracer and cutter being located in planes at right angles to said spindles, the combination with a face-plate adapted for reciprocation in a plane at right angles to said spindles and parallel to the line between the spindles, the surface of said face-plate being parallel to the planes of the working portions of said tracer and cutter, of means mounted upon and carried by said face-plate for accurately locating corresponding portions respectively of the model and die in intersecting planes parallel respectively to the plane of said spindles and to the surface of said face-plate and means for clamping the pattern and die respectively when so located to reciprocate with said face-plate.

6. In a die cutting machine or the like, the combination of a reciprocating face-plate, brackets mounted thereon for supporting respectively the model and die, means on said brackets cooperating with and for locating the faces of the model and die in the same plane at a fixed distance from and parallel with the surface of said face-plate and clamping means operable in conjunction with said locating means for clamping the model and die respectively to said brackets.

7. In a die cutting machine or the like, the combination with a tracer and cutter, of a face-plate adapted to be reciprocated transversely thereof, a pair of brackets secured to the face-plate at a distance from each other equal to the distance between the tracer and cutter, a second pair of brackets, each adapted for adjustment toward and from one of the brackets first mentioned, and racks and pinions cooperating between the face-plate and the respective adjustable brackets for adjusting the latter, substantially as described.

8. In a die cutting machine or the like, the combination with a tracer and cutter, of a face-plate movable transversely thereof, a bracket fixed to said face-plate, a second bracket mounted on the face-plate for adjustment toward and from said fixed bracket, racks and pinions for adjusting the adjustable bracket and means for securing said adjustable bracket to the face-plate in adjusted position.

9. In a die cutting machine or the like, the combination with a tracer and cutter, of a face-plate movable transversely thereof, a bracket fixed to said face-plate, a second bracket mounted on the face-plate for adjustment toward and from said fixed bracket, racks and pinions for adjusting the adjustable bracket, means for securing said adjustable bracket to the face-plate in adjusted position, and pawls cooperating with said pinion for holding said adjustable bracket in temporary adjustment when the last named means are released.

10. In a die cutting machine or the like, the combination with a tracer and cutter, of a face-plate movable in a plane at right angles thereto, a fixed bracket secured to said face-plate, a second bracket mounted on said face-plate and adjustable with relation to the first named bracket, means on said brackets for holding the face of the work in a plane parallel to the surface of the face-plate at a fixed distance therefrom, clamps for holding the work against said holding means on the brackets and means accessible through the outer edges of said brackets for securing said clamps.

11. In a die cutting machine or the like, the combination with a tracer and cutter, of a face-plate movable in a plane at right angles to the axes of said tracer and cutter and in a direction parallel to a line joining corresponding points thereof, brackets on said face-plate for holding the model and die respectively, lugs or members on said brackets for accurately locating corresponding parts of the model and die in the same planes parallel to said line between the tracer and cutter, members on said brackets for holding the faces of the model and die in the same plane parallel to the plane of reciprocation of said face-plate, means for adjusting said brackets respectively to the model and die and means for clamping respectively the model and die against the corresponding holding faces on said brackets.

W. P. CARTWRIGHT.
JOSEPH F. KELLER.